Figure 1:
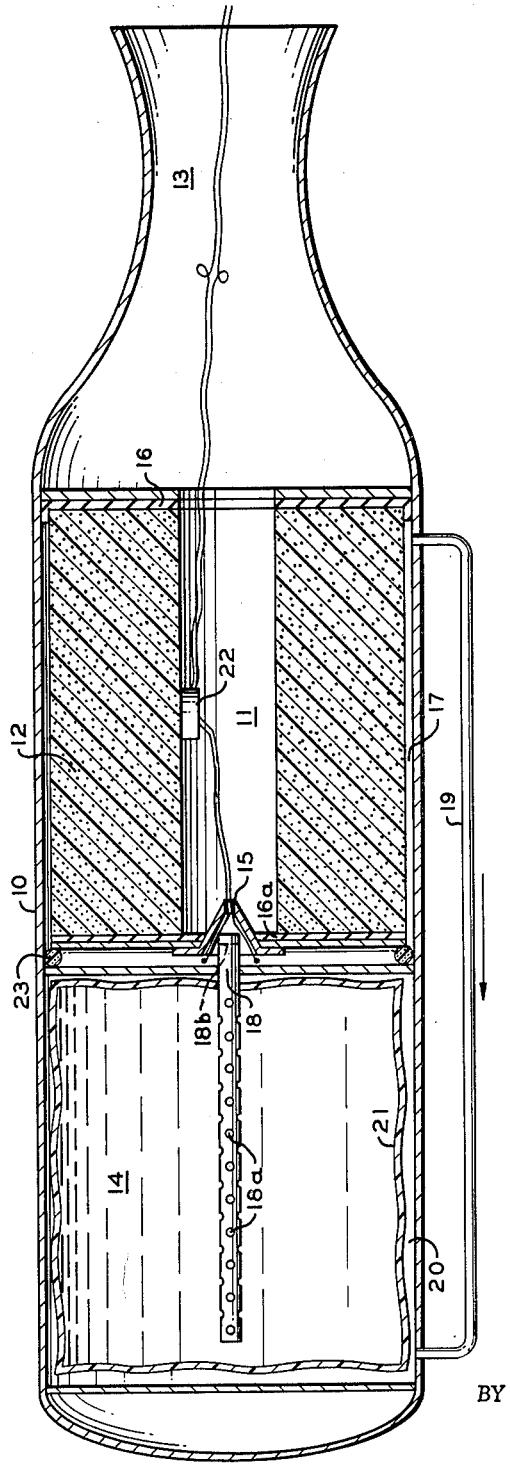

Dec. 24, 1963     H. M. FOX     3,115,007
SELF-ACTUATING HYBRID ROCKET MOTOR
Filed Sept. 22, 1958     2 Sheets-Sheet 1

INVENTOR.
H. M. FOX
BY Hudson and Young
ATTORNEYS

Dec. 24, 1963  H. M. FOX  3,115,007
SELF-ACTUATING HYBRID ROCKET MOTOR
Filed Sept. 22, 1958  2 Sheets-Sheet 2

INVENTOR.
H. M. FOX
BY Hudson and Young

ATTORNEYS

United States Patent Office 3,115,007
Patented Dec. 24, 1963

3,115,007
SELF-ACTUATING HYBRID ROCKET MOTOR
Homer M. Fox, Bartlesville, Okla., assignor to Phillips Petroleum Company, a corporation of Delaware
Filed Sept. 22, 1958, Ser. No. 762,660
3 Claims. (Cl. 60—35.6)

This invention relates to a self-contained, self-actuating, hybrid rocket system. In one aspect this invention relates to a rocket motor actuated by an oxidizer-rich solid propellant and an auxiliary fluid fuel. In another aspect this invention relates to a rocket motor which is actuated by a fuel-rich solid propellant and an auxiliary fluid oxidizer.

It is known to operate a rocket motor with a solid propellant charge and to augment the solid propellant with a source of fluid fuel or oxidizer to supply a deficiency of the solid propellant. These rocket motors are generally referred to as hybrid rocket motors. The principal purpose of a hybrid rocket motor is to provide a means for controlling the ratio of fuel to oxidizer present in a solid propellant-containing combustion zone so that burning rate can be set at a desired and useful level. For maximum performance control of a hybrid rocket this presupposes that the solid propellant will be deficient in either oxidizer or fuel and the fluid will supply the component in which the solid propellant is deficient. Thus the fuel-oxidizer ratio in the combustion zone can be operated fuel-rich, oxidizer-rich, or stoichiometric as the occasion requires.

In such previously proposed rockets a separate pressurizing system is required to force the augmenting fluid through the injector and into contact with the burning solid propellant. Some of these proposed methods include: a turbo-pump system with the attendant disadvantage of requiring costly apparatus not suitable for use in a small rocket motor; the use of volatile liquid propellant components which depend upon their own vapor pressure for expulsion with the attendant disadvantage of requiring very high tensile strength tank walls and therefore a limitation upon the choice of liquids which can be used for augmenting fluids; and the use of a gas pressurizing system using a solid or a liquid propellant gas generator for generating the pressurizing gas.

In my copending application Serial No. 502,154, filed April 18, 1955, now Patent No. 3,068,641, I have disclosed and claimed the use of a solid propellant gas generator as the source of pressurizing gas for pressurizing a supplemental supply of liquid oxidizer to a fuel-rich solid propellant. The present invention provides a method and means for supplying additional fluid to a solid propellant without the necessity for a separate pressurizing or pumping system and is, in that respect, an improvement over the above-referred to copending application. The present invention provides a method and means for pumping the fluid to the combustion chamber by means of the energy developed in the combustion chamber. The propellants disclosed in the above-referred to copending application are applicable for use in the present invention.

It is, therefore, an object of this invention to provide a simplified type of hybrid rocket motor.

It is also an object of this invention to provide a simplified rocket motor wherein an auxiliary fluid is supplied to a solid propellant being burned in the combustion chamber by utilizing the energy developed in the combustion chamber to supply the fluid to the combustion chamber.

A further object of the invention is the provision of a hybrid rocket motor having a simplified injection system that does not require a separate pumping system.

Still another object of this invention is the provision of a method and means for supplying a combustion supporting fluid to a combustible charge in a combustion chamber.

Figure 2:
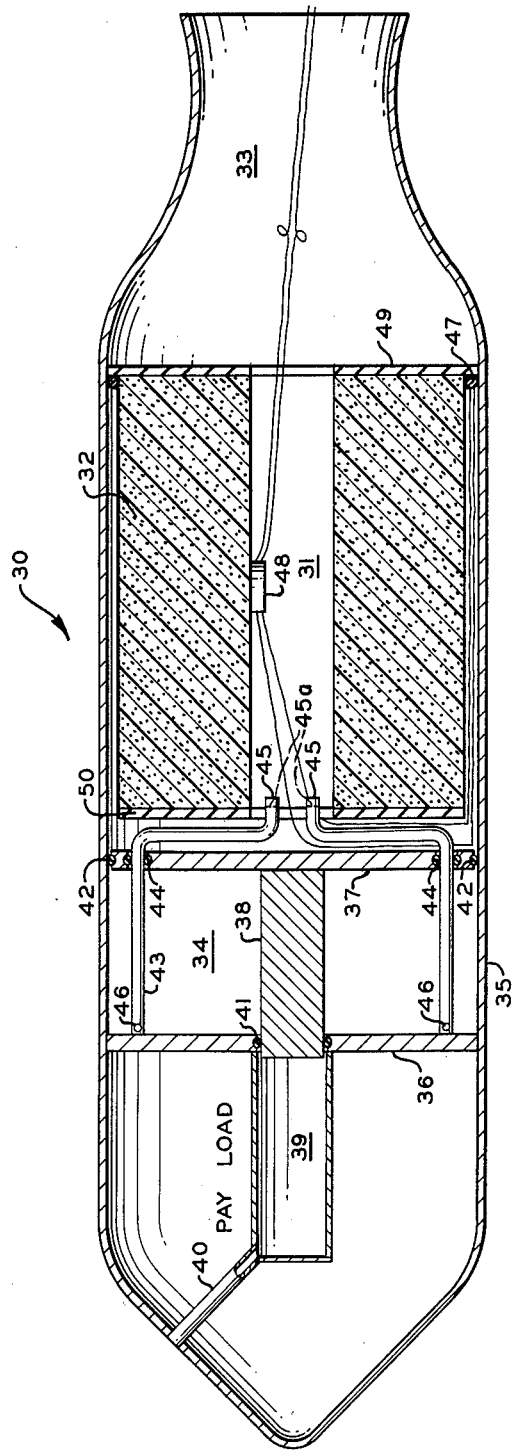

Other objects and advantages will be apparent to one skilled in the art upon study of the present disclosure including the detail description and the drawing wherein:

FIGURE 1 is a schematic sectional view of a preferred embodiment of the present invention, and FIGURE 2 is a schematic sectional view of a modification of the invention.

Broadly, the invention contemplates a method and means for utilizing the energy available in the combustion chamber of a rocket motor, wherein a solid combustible charge is being burned, to supply a combustion supporting fluid to the combustion chamber. In one embodiment of the invention the gases which pass at high velocity through the combustion chamber are utilized to aspirate a fluid from a supply source into the combustion chamber and a means is provided to equalize the pressure on the fluid supply with that of the combustion chamber. In another embodiment of the invention the pressure in the combustion chamber is utilized to operate a piston which comprises a movable wall of a fluid supply so as to force fluid into the combustion zone. A portion of this movable piston is in contact with the ambient pressure so as to provide sufficient differential pressure to supply the fluid to the combustion chamber.

The solid combustible charge can be an oxidizer-rich solid such as pressed ammonium nitrate or pressed ammonium perchlorate; in which case the combustion supporting fluid will be a fuel component such as gasoline, kerosene, any of the known jet fuel compositions, or other liquid hydrocarbon suitable as a fuel when combined with a source of oxygen.

The solid combustible charge can be a fuel-rich solid such as a mixture of a solid oxidant such as ammonium nitrate or ammonium perchlorate together with a rubbery binder material such as a copolymer of a conjugated diene and a heterocyclic nitrogen base, as described in my above-referred to copending application. Other fuel-rich combustible solids include ammonium nitrate with an asphalt binder, ammonium nitrate or ammonium perchlorate with various binder materials such as polysulfide rubber, polyvinyl chloride, etc., and nitroguanidine, sodium nitrate or potassium nitrate with suitable binder materials such as those set forth above. Other fuel-rich combustible solids include a pressed charge of an organic nitrate or an organic perchlorate such as diisopropylaminenitrate, diisopropylamineperchlorate or N,N,N',N'-tetramethylbutane-1,3-diamine dinitrate. The fuel-rich combustible solid also can be a high energy material such as a boron-perchlorate charge. The combustion supporting fluid for use with the fuel-rich combustible solid charges will be an oxygen containing fluid such as nitric acid, hydrogen peroxide, liquid oxygen and the like.

Referring now to the drawing, and particularly to FIGURE 1, a rocket motor 10 is illustrated comprising combustion chamber 11 which contains solid propellant charge 12 to provide thrust for the rocket motor by evolution of gases which are exhausted through exhaust nozzle 13. A flexible bag 21 contains a supplemental fluid 14 which can be a fuel when propellant charge 12 is oxidizer-rich and can be an oxidizer when solid propellant 12 is fuel-rich. Tube 18 containing a plurality of ports 18a communicates with liquid 14 and combustion chamber 11 via orifice 15. The nozzle, which comprises the open end of tube 18, is closed, for example, by a fusible plug 18b which is melted upon ignition of the propellant charge. The solid propellant charge 12 burns on both the outside and inside surfaces. The outside passage is closed off by restrictor material 16 so that the gas is forced through the annulus 17, orifice 15 and combustion chamber 11. Before entering the combustion chamber 11, flow is restricted at 15. The restriction at 15 is designed similar to an automobile carburetor so as to cause as little pressure drop as possible. Flow of the fluid 14 from the flexible bag 21 through the tube 18 and nozzle 15 is achieved by the drop in static pressure in the orifice 15 due to the high gas velocity. Line 19 transmits the pressure from annulus 17 to the section 20 containing flexible bag 21, which, in turn, contains fluid 14. The pressure in the annulus 17 applied to the flexible bag 21 is sufficient to supply the fluid 14 to the orifice 15. Flexible bag 21 can be made of rubber, polyethylene, rubberized fabric or other suitable material.

Since the burning surface of an internal-external charge remains substantially the same during the firing period, flow is held constant and the level of flow is determined therefore by the size of tube 18 and nozzle 15.

The propellant charge is ignited by igniters 22 and 23 which can be conventional igniters such as charge of black powder containing electrical resistance wires connected to a suitable source of electrical power.

The advantages of this system include:

(1) An increase in the specific impulse of the system;

(2) The provision of a means of thrust control by employing a control valve in tube 18; and (3) Retention of simplicity of a solid rocket coupled with high thrust obtainable by augmenting the thrust of the solid propellant with a liquid automatically supplied to the combustion chamber.

If such a rocket motor is intended for use in armament or high acceleration applications, the orifice 15 is designed to be consumed at a controlled rate and acceleration is depended upon to pump most of the fluid into the combustion chamber. This permits the use of the system of the invention without the inherent losses suffered by restricting the flow at orifice 15. In some applications, it is desirable to increase thrust at a finite rate so as to control acceleration. In such case acceleration can be used as the sole source of pressure head to pump fluid 14.

Referring now to FIGURE 2, rocket motor 30 comprises combustion chamber 31, internal-external burning solid charge 32, exhaust nozzle 33 and auxiliary fluid supply 34. Auxiliary fluid supply 34 occupies a container composed of rocket motor case 35, bulkhead 36 and movable piston 37. A piston rod 38 extends from movable piston 37 and traverses passageway 39 which is in communication with the atmosphere by means of vent 40. Sealing means 41 prevents leakage of the fluid in container 34 around piston rod 38. Sealing means 42 provides a seal between movable piston 37 and rocket motor case 35. Tubes 43 are secured to bulkhead 36 and extend through movable piston head 37, wherein sealing contact is made between tube 43 and piston head 37 by sealing means 44, and terminate in nozzles 45 in combustion chamber 31. Nozzles 45 are preferably sealed with a fusible material 45a prior to firing of the rocket. The fluid in container 34 gains access to tubes 43 by means of ports 46.

Ignition of solid propellant 43 is achieved by ring igniter 47 and cartridge igniter 48 which can be conventional igniters such as a charge of black powder having embedded therein an electrical resistance wire which is connected to a source of electrical energy (not shown).

Propellant charge 32 is restricted at the ends by restrictor 49 and restrictor 50.

Sealing means 41, 42 and 44 can be constructed of conventional sealing materials such as rubber or other resilient material which is not readily consumed by the combustion gases in the combustion chamber 31.

It will be appreciated by those skilled in the art that materials which are subjected to the high temperatures of the burning propellant will be constructed of materials capable of withstanding such temperatures or will be adequately insulated. Restrictor materials used to control the burning area of the solid propellant will usually provide sufficient insulation to ordinary metals used for construction of rocket elements.

Reasonable variations and modifications are possible within the scope of the present disclosure without departing from the spirit and scope of the invention.

That which is claimed is:

1. In a rocket motor comprising a combustion chamber, an exhaust nozzle, and an end-restricted, external-internal burning solid propellant grain having a perforation through its longitudinal axis and comprising a major proportion of a solid inorganic oxidizing salt and a minor proportion of a rubber binder which grain is positioned in said combustion chamber and spaced from the wall thereof, the combination therewith of means for sealing the annulus between the grain and the combustion chamber wall at the end of the grain adjacent the exhaust nozzle so that all of the combustion gases pass through the grain perforation to the exhaust nozzle; a continuous passageway communicating with said annulus and the grain perforation at the end of the grain opposite the exhaust nozzle for passage of combustion gases; an expellant chamber, the internal volume of which is capable of being decreased by the application of pressure to the external surface, positioned in said rocket motor adjacent said propellant grain opposite said exhaust nozzle; conduit means having one end terminating in the interior of said expellant chamber and the other end terminating in a feed nozzle closed by a fusible plug, said feed nozzle being in fixed position adjacent the grain perforation at the end of the grain opposite the exhaust nozzle; means to effect a differential between the internal pressure of said expellant and the combustion chamber pressure adjacent said feed nozzle so as to provide sufficient differential pressure to supply fluid contained in said expellant chamber to said perforation in the grain via said feed nozzle upon fusion of said fusible plug; and means for igniting said propellant grain.

2. In a rocket motor comprising a combustion chamber, an exhaust nozzle, and an end-restricted, external-internal burning solid propellant grain having a perforation through its longitudinal axis and comprising a major proportion of a solid inorganic oxidizing salt and a minor proportion of a rubber binder which grain is positioned in said combustion chamber and spaced from the walls thereof, the combination therewith of means for sealing the annulus between the grain and the combustion chamber wall adjacent the exhaust nozzle so that all of the combustion gases pass through the grain perforation to the exhaust nozzle; a continuous passageway communicating with the annulus formed between the grain and combustion chamber wall and the grain perforation at the end of the grain opposite the exhaust nozzle; an orifice means positioned to occupy the grain perforation at the end of the grain opposite the exhaust nozzle and having an opening therethrough which is smaller in cross-sectional area than that of the grain perforation, said orifice means being defined by orifice means walls which converge in the direction of the exhaust nozzle; a flexible bag containing a liquid oxidizing agent confined in a closed space in said motor adjacent the end of the propellant grain opposite the exhaust nozzle; a conduit having one end open and terminating within said flexible bag and having the other end closed by a fusible plug and terminating in said orifice means; means to equalize the pressure in the annulus between the grain and the combustion chamber wall with that of the interior of the closed space outside the flexible bag so that fluid flows from said bag to a zone of reduced pressure in said orifice means when the fusible plug is melted by the heat of combustion gases; and means for igniting said propellant grain.

3. In a rocket motor comprising a rocket motor case, a combustion chamber, an exhaust nozzle, an end-restricted, internal-external burning solid propellant grain comprising a major proportion of a solid inorganic oxidizing salt and a minor amount of a rubber binder which grain is positioned in said combustion chamber and spaced from the wall thereof, the combination therewith of means for sealing the annulus between said grain and said wall adjacent the exhaust nozzle; a continuous passageway communicating with said annulus and the grain perforation at the end of the grain opposite said exhaust nozzle so that all of the combustion gases pass through said grain perforation to the exhaust nozzle; a fluid supply chamber positioned in said motor case adjacent the end of said propellant grain opposite said exhaust nozzle and having a rigid forward wall forming a bulkhead of said motor case; a piston occupying substantially the entire cross-sectional area of said combustion chamber and disposed in said motor case so as to form a movable rearward wall separating said fluid supply chamber from said combustion chamber; resilient sealing means positioned between said piston and said rocket motor case; a piston rod secured to said piston and passing through said forward wall into an enclosed passageway in the forward portion of the motor case; vent means connecting said enclosed passageway with the exterior of said motor case; resilient sealing means positioned between said piston rod and said forward wall; conduit means open to the interior of said fluid supply chamber, rigidly connected to the rigid forward wall of said fluid supply chamber, extending through said piston and terminating in a feed nozzle positioned in the grain perforation at the end opposite said exhaust nozzle; a fusible plug sealing the feed nozzle of said conduit; resilient sealing means positioned between said conduit and said piston; and means to ignite said propellant grain.

References Cited in the file of this patent

UNITED STATES PATENTS

| | | |
|---|---|---|
| 2,129,875 | Rost | Sept. 13, 1938 |
| 2,683,963 | Chandler | July 20, 1954 |
| 2,700,337 | Cumming | Jan. 25, 1955 |
| 2,752,989 | Jenkins | July 3, 1956 |
| 2,753,801 | Cumming | July 10, 1956 |
| 2,791,883 | Moore et al. | May 14, 1957 |

FOREIGN PATENTS

| | | |
|---|---|---|
| 695,048 | Great Britain | Aug. 5, 1953 |